May 10, 1960 W. K. BADER 2,936,201
BEARING FOR TAKING UP LARGE AXIAL LOADS
Filed July 19, 1955 2 Sheets-Sheet 1

INVENTOR
WILHELM K. BADER

BY Dicke and Craig
ATTORNEYS

May 10, 1960 W. K. BADER 2,936,201
BEARING FOR TAKING UP LARGE AXIAL LOADS
Filed July 19, 1955 2 Sheets-Sheet 2
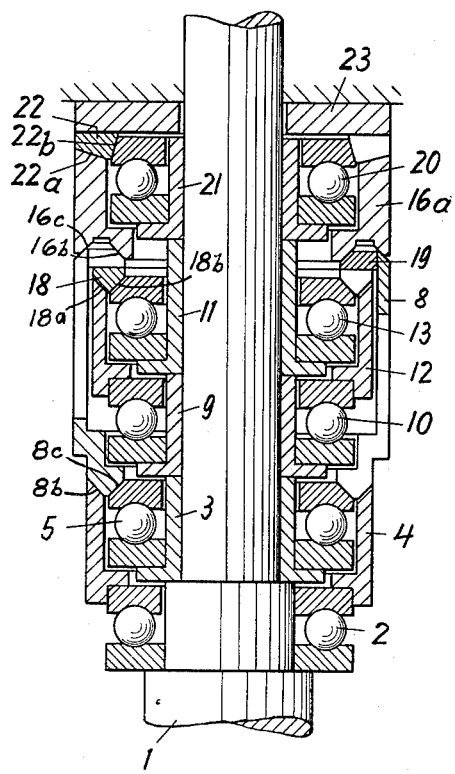
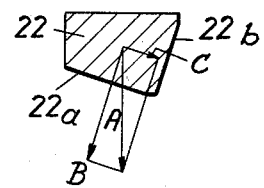
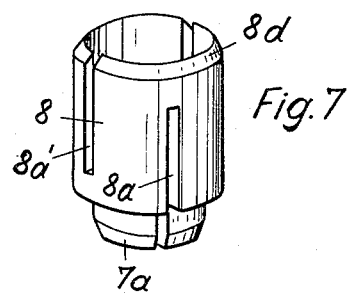
INVENTOR
WILHELM K. BADER
BY Dicke and Craig
ATTORNEYS United States Patent Office 2,936,201
Patented May 10, 1960

2,936,201

BEARING FOR TAKING UP LARGE AXIAL LOADS

Wilhelm K. Bader, Stuttgart-Unterturkheim, Germany, assignor to Daimler-Benz Aktiengesellschaft, Stuttgart-Unterturkheim, Germany Application July 19, 1955, Serial No. 523,095

Claims priority, application Germany July 19, 1954

10 Claims. (Cl. 308—227)

This invention relates to a bearing suited particularly for taking up large axial loads at simultaneously large rotational speeds.

The invention has as one of its objects to provide a bearing in which axial thrust is distributed in a comparatively simple and space-saving manner.

Another object of the invention is a method of distributing the bearing pressures to the individual bearings, said method being both accurate and comparatively insensitive to variations, so that axial pressures are safely and reliably absorbed.

Accordingly, one feature of the invention is to provide intermediate members acting in the manner of balance beams and which have at least two taper surfaces thereon, associated with two different bearings or groups of bearings, for distributing the bearing pressures to said bearings or groups of bearings.

A further object of the invention is to distribute the bearing pressures to the individual bearings provided so that each individual bearing will receive as near as possible the same share of the load.

It is advisable in the case of a major number of bearings to distribute the axial thrust first to two or more main groups and from there to the individual bearings. A further stage of distribution may be provided if necessary. The thrust may be distributed to both even and odd numbers of bearings by using, for instance, in the case of uneven distribution, friction rings with different taper angles.

A still further object of the invention relates to a particularly convenient construction of the individual constructional elements forming the bearing. Thus, the taper rings provided for distributing the axial forces are preferably slotted for ease in obtaining a balance. Balls may alternatively be used in place of slotted taper rings to ensure frictionless operation of the distributing device.

Further objects and features of the invention will appear from the following description, the appended claims, and the drawings which show several embodiments of the invention in which:

Fig. 5 is an axial section through a form of construction comprising five bearings and taper rings as balancing members;

Fig. 6 is a diagrammatic view of the distribution of forces in the case of taper rings designed for uneven distribution of the bearing pressures; and Fig. 7 is a perspective view of a slotted sleeve serving the transmission of forces between the bearings.

Figure 1:
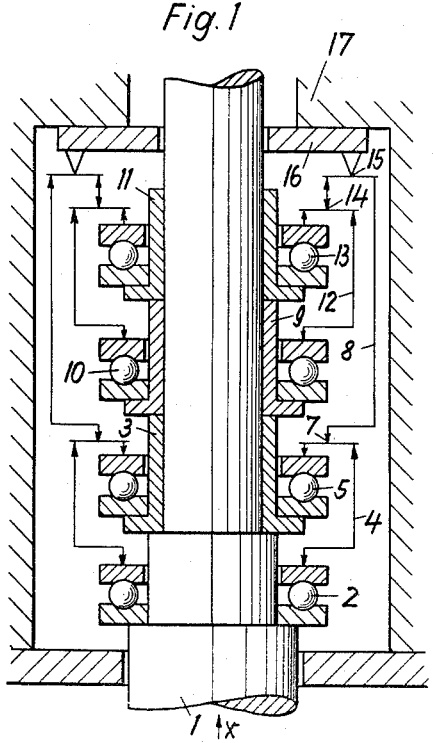
Fig. 1 is a diagrammatic view of the distribution of loads to four bearings on the balance beam principle.

Referring to Fig. 1, the axial load, for instance, of a hydrostatic transmission, is initiated in the direction of the arrow $x$ by means of a shaft 1. Said load is at first distributed to the bearing 2 and the thrust sleeve 3. The bearing 2 transfers its part load to the sleeve 4. A part load is deviated to the bearing 5 from the thrust sleeve 3. The load balance, that is, the even distribution of loads to the two bearings 2 and 5, is made at the balancing point 7. From point 7, the re-united part loads are transmitted further via the sleeve 8. The remaining axial load transmitted from the sleeve 3 is taken up by the sleeve 9, whence it branches out via the bearing 10 to the sleeve 12 and via the sleeve 11 to the bearing 13. At the balancing point 14, the loads are again balanced between the bearing 10 and the bearing 13. The over-all balancing of the re-united part loads from balancing points 7 and 14 takes place at the balancing point 15, where said part loads are transmitted by means of the thrust ring 16 to the housing 17, their magnitude corresponding to the total axial load introduced at 1.

Conditions are of course identical if the flow of forces is considered in the opposite direction, i.e., from the housing 17 to the shaft 1.

Figure 2:
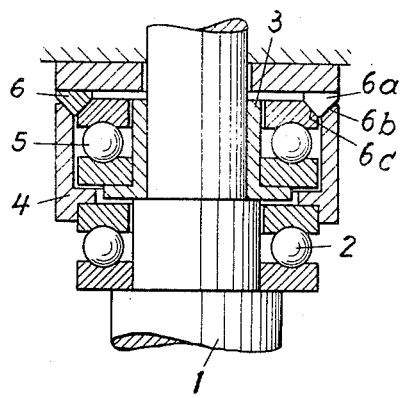
Fig. 2 is an axial section through a form of construction comprising two bearings and taper rings as balancing members.

Fig. 2 shows an axial sectional view of an example of construction comprising two bearings 2 and 5 and a taper ring 6 as a balancing member. The axial load introduced by the shaft 1 branches out to the bearing 2 and the sleeve 3. The part load is transmitted from the bearing 2 to the sleeve 4, whereas it is taken up from the sleeve 3 by the bearing 5. The balance of loads between the bearing 5 and the sleeve 4 is achieved by the taper ring 6 which is supported against the housing by means of the thrust washer 7. To this end, the taper ring 6 is slotted at 6a and is provided with taper surfaces 6b and 6c engaging corresponding taper surfaces on the sleeve 4 and the ball bearing 5, respectively, an accurate balance of forces being ensured by the spring action produced by the slot 6a in conjunction with the identical taper angles (of, for instance, 45° relative to the face of the thrust washer 7) of the surfaces 6b and 6c.

Figure 3:
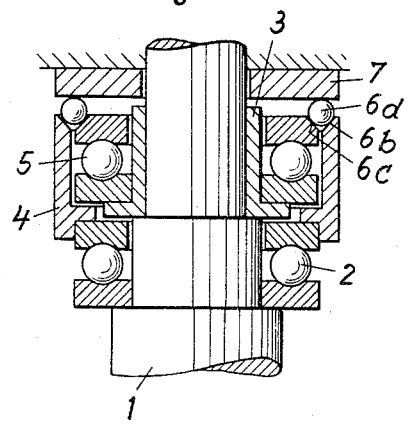
Fig. 3 is an axial section through a form of construction comprising two bearings and balls as balancing members.

Fig. 3 shows a similar view to Fig. 2, but with thrust balls 6d used in place of a taper ring associated with the taper surfaces 6b, 6c of the bushing 4 and the ball bearing 5. The balls can be guided, for instance, in cages, or in grooves in the thrust washer 7.

Figure 4:
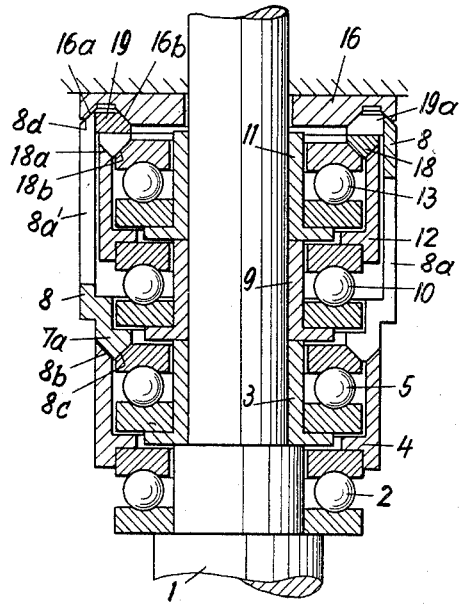
Fig. 4 is an axial section through a form of construction comprising four bearings and taper rings as balancing members.

In the form of construction according to Fig. 4 which corresponds to that of Fig. 1, the pressure point 7 of Fig. 1 is represented by the taper ring 7a which is integral with the bushing 8, the pressure point 14, by the taper ring 18 and the pressure point 15 of Fig. 1, by the taper surfaces of the thrust washer 19.

Fig. 7 is a perspective view of the slotted sleeve 8 serving to transmit the bearing pressures. The sleeve 8 with its taper surfaces 8b and 8c is supported on corresponding taper surfaces of the unslotted sleeve 4 and the ball bearing 5 and is provided with slots 8a and 8a' which have alternative downward and upward openings and produce the spring action of the sleeve.

The upper end of the sleeve with a taper surface 8d engages a corresponding taper surface 16a of the thrust washer 16, which on the other hand by means of a taper surface 16b is supported against a ring 19 provided with slots 19a and which in turn bears against the slotted ring 18, which by means of taper surfaces 18a and 18b is associated with the sleeve 12 and the ball bearing 13, respectively. The transmission of forces corresponds to that of Fig. 1.

The embodiment according to Fig. 5 shows the distribution of the axial thrust to five ball bearings 2, 5, 10, 13 and 20, the thrust sleeve 16a (which replaces the thrust washer 16 of Fig. 4) transmitting its share of the bearing pressure, and the sleeve 11 in turn transmitting, either directly or via the sleeve 21 and the ball bearing 20, a remainder of the axial thrust, to the slotted taper ring 22, which in turn bears against the thrust washer 23. The taper surfaces 22a and 22b of the slotted taper ring 22 are inclined at different angles relative to the axis of the shaft 1 so that, as shown in Fig. 6, with the system in a state of balance and with a resultant axial thrust A, a comparatively large thrust component B falls to the taper surface 22a and a comparatively small thrust component C, to the taper surface 22b. Said angles of inclination can be arranged so that, corresponding to the four thrust bearings 2, 5, 10 and 13, a load share of four-fifths of the total axial thrust is transmitted via the surface 22a, and, corresponding to the fifth bearing, 20, a share in the load of one-fifth of the axial thrust, is transmitted via the surface 22b.

If we consider the flow of forces from 23 to 1, we note that one-fifth of the axial thrust is at first distributed to the bearing 20, and four-fifths to the sleeve 16a, the latter share being transmitted, each for half its value, i.e., for two-fifths of the total load, from tapered surfaces 16c and 16b to the sleeve 8 and the thrust ring 19, the latter having a tapered surface coacting with tapered surface 16b. Each of the parts 8 and 19 in turn halves the load it receives, so that one-fifth each of the total load falls to the bearings 13 and 10 on the one hand and the bearings 5 and 2 on the other.

As to the load on bearings 13 and 10, this is transmitted from thrust ring 19 via ring 18 which is provided with two tapered surfaces 18a and 18b, surface 18b coacting with a tapered surface on bearing 13 and surface 18a coacting with a similar surface on sleeve member 12, the latter abutting a race of bearing 10. As to the load on bearings 5 and 2, this is transmitted from tapered surface 16c to a similar surface on sleeve 8. At the other end of the latter are tapered surfaces 8c and 8b, the surface 8c cooperating with a similar surface on a race of bearing 5 and surface 8b engaging a tapered surface on a sleeve 4 which abuts a race of bearing 2.

With reference to the structure disclosed in the various embodiments of the invention, the upper endmost element surrounding the upper end of shaft 1, as for example member 23 of Figure 5, may be considered as a first end member. The double shoulder construction shown at the lower end of the shaft may be considered as a second end member. The various members disposed axially between the two end members and comprised in the Figure 5 construction for example by the slotted rings 22, 19 and 18 and by the sleeve members such as 16a, 8 and 4 may be considered as intermediate members. Ring 22, for example, may be considered as a ring-shaped intermediate member and sleeve-shaped members 16, 8 and 4 may be considered as first, second and third intermediate members.

I do not restrict myself to the particular forms of construction illustrated and described, but desire to avail myself of all modifications that may fall within the scope of the several features of the invention.

What I claim is:

1. A bearing for taking up axial forces, comprising a first end member and a second end member disposed mutually axially and relatively rotatably, a first intermediate member supported axially on said first end member and comprising two taper surfaces inclined relative to the axial direction of the bearing, a second intermediate member provided at one end thereof with a taper surface, associated with one of the two taper surfaces of said first intermediate member, and provided at the other end thereof with two taper surfaces inclined relative to the axial direction, at least one single bearing between said first intermediate member and said second end member, with means for axially supporting said single bearing on the other of the two taper surfaces of said first intermediate member, at least one second single bearing, with means for the axial supporting thereof on the first of the two last-named taper surfaces of said second intermediate member and means for the axial supporting thereof on the second end member, at least one third single bearing, with means for the axial supporting thereof on the second of the two last-named taper surfaces of said second intermediate member, said third single bearing being axially supported on said second end member, wherein said intermediate members are at least partially sleeve-shaped elements at least one of said elements being provided with axial slots extending into said one of said elements alternatively from either end.

2. A bearing for taking up axial forces, comprising a first end member and a second end member disposed mutually axially and relatively rotatably, first individual bearing means, second individual bearing means, said first and second individual bearing means being supported axially on said second end member, means for supporting said first and second individual bearing means on said first end member comprising at least one intermediate member with taper surfaces inclined relative to the axial direction of the bearing in such a manner as to cause an axial thrust acting on said first end member to be distributed in different shares via said intermediate member to said two groups of individual bearings, said intermediate member consisting of an at least partially slotted ring the width of which diminishes gradually in the axial direction, said bearing further including bearing and load distributing means comprising two sleeve-shaped members each provided with mutually contacting taper surfaces.

3. A bearing for taking up axial forces, comprising a first end member and a second end member disposed mutually axially and relatively rotatably, first individual bearing means, second individual bearing means, said first and second individual bearing means being supported axially on said second end member, means for supporting said first and second individual bearing means on said first end member comprising at least one intermediate member with taper surfaces inclined relative to the axial direction of the bearing in such a manner as to cause an axial thrust acting on said first end member to be distributed in different shares via said intermediate member to said two groups of individual bearings, said bearing further including bearing and load distributing means comprising two sleeve-shaped members each provided with mutually contacting taper surfaces.

4. A bearing with an odd number of single bearings, for taking up axial forces, comprising a first end member and a second end member disposed mutually axially and relatively rotatably, first individual bearing means, second individual bearing means, said first and second individual bearing means being supported axially on said second end member, means for supporting said first and second individual bearing means on said first end member comprising at least one intermediate member with taper surfaces inclined relative to the axial direction of the bearing in such a manner as to cause an axial thrust acting on said first end member to be distributed in different shares via said intermediate member to said two groups of individual bearings, said bearing further including bearing and load distributing means comprising two sleeve-shaped members each provided with mutually contacting taper surfaces.

5. A bearing as claimed in claim 4, wherein said intermediate member has taper surfaces of different angles of inclination thereon, and wherein the last-named means comprise an additional intermediate member with taper surfaces of identical angles of taper relative to the axial direction of the bearing, an identical number of single bearings being associated with each of said two taper surfaces.

6. A bearing as claimed in claim 1, wherein said sleeve-shaped intermediate members form sleeve-shaped enclosures around at least part of said single bearings.

7. A bearing for taking up axial forces, comprising a first end member and a second end member disposed mutually axially and relatively rotatably, a first intermediate member supported axially on said first end member and comprising two taper surfaces inclined relative to the axial direction of the bearing, a second intermediate member provided at one end thereof with a taper surface, associated with one of the two taper surfaces of said first intermediate member, and provided at the other end thereof with two taper surfaces inclined relative to the axial direction, at least one single bearing between said first intermediate member and said second end member, with means for axially supporting said single bearing on the other of the two taper surfaces of said first intermediate member, at least one second single bearing, with means for the axial supporting thereof on the first of the two last-named taper surfaces of said second intermediate member and means for the axial supporting thereof on the second end member, at least one third single bearing, with means for the axial supporting thereof on the second of the two last-named taper surfaces of said second intermediate member, said third single bearing being axially supported on said second end member, said second intermediate member being of a resilient construction, said intermediate member by such construction yieldably controlling the distribution of stresses in said bearing.

8. A bearing according to claim 7, in which said construction comprises axial slots.

9. A bearing according to claim 8, in which said slots extend into said second intermediate member alternatively from either end.

10. A bearing for taking up axial forces, comprising a first end member, a second end member, a ring-shaped intermediate member having an inner and an outer taper surface inclined at opposite angles relative to the axial direction of the bearing, a first thrust ball bearing, means for supporting said bearing on said ring-shaped intermediate member comprising said inner taper surface, means for supporting said bearing on said second end member, a first sleeve-shaped intermediate member enclosing said thrust ball bearing and provided at one end thereof with means for support on said outer taper surface, said sleeve-shaped intermediate member being provided at the other end thereof with an inner and an outer taper surface inclined at opposite angles relative to the axial direction of the bearing, an additional intermediate member, coacting means between said additional intermediate member and said inner taper surface, said additional intermediate member being provided with an inner and an outer taper surface inclined at opposite angles relative to the axial direction of the bearing, a second sleeve-shaped intermediate member associated with said outer taper surface of said first sleeve-shaped intermediate member, said second sleeve-shaped intermediate member being provided with an outer tapered surface, a second thrust bearing, means for supporting said second thrust bearing on said additional intermediate member comprising said inner taper surface of said additional intermediate member, means for supporting said second thrust bearing on said second end member, a third sleeve-shaped member, means for supporting said third sleeve-shaped member on said second sleeve-shaped intermediate member comprising said outer taper surface on said second sleeve-shaped intermediate member, at least one thrust ball bearing arranged between said second sleeve-shaped intermediate member and said second end member and enclosed by said third sleeve-shaped intermediate member, and an additional thrust bearing disposed between said third sleeve-shaped intermediate member and said end member.

References Cited in the file of this patent

UNITED STATES PATENTS

| 1,424,640 | Hall | Aug. 1, 1922 |
| 1,905,333 | Barrett | Apr. 25, 1933 |

FOREIGN PATENTS

| 23,370 | Great Britain | 1904 |